United States Patent
Sreenivasareddy et al.

(10) Patent No.: US 12,348,247 B2
(45) Date of Patent: Jul. 1, 2025

(54) WIRELESS MODEM WITH SOFTWARE CONFIGURABLE MULTIPLE ANTENNA PORTS

(71) Applicant: Intel Corporation, Santa Clara, CA (US)

(72) Inventors: Madhukiran Sreenivasareddy, Bangalore (IN); Vamshi Krishna Aagiru, Bangalore (IN); Jayprakash Thakur, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 17/449,264

(22) Filed: Sep. 29, 2021

(65) Prior Publication Data

US 2023/0096115 A1  Mar. 30, 2023

(51) Int. Cl.
*H04B 1/00* (2006.01)
*H04B 7/0413* (2017.01)

(52) U.S. Cl.
CPC .......... *H04B 1/0057* (2013.01); *H04B 1/006* (2013.01); *H04B 7/0413* (2013.01)

(58) Field of Classification Search
CPC .... H04B 1/0057; H04B 1/006; H04B 7/0413; H04B 7/0608
See application file for complete search history.

(56) References Cited

U.S. PATENT DOCUMENTS

| | | | | |
|---|---|---|---|---|
| 6,072,994 | A * | 6/2000 | Phillips | H04B 1/0003 455/280 |
| 12,081,244 | B2 * | 9/2024 | Pehlke | H04L 5/14 |
| 2010/0260082 | A1 * | 10/2010 | Lum | H04B 1/0057 370/297 |
| 2013/0244722 | A1 * | 9/2013 | Rousu | H04B 1/0057 455/552.1 |
| 2015/0105121 | A1 * | 4/2015 | Emmanuel | H04W 74/002 455/553.1 |
| 2018/0183140 | A1 * | 6/2018 | Liu | H01Q 1/273 |
| 2020/0321935 | A1 * | 10/2020 | Ayranci | H04B 1/0053 |
| 2022/0329266 | A1 * | 10/2022 | Pehlke | H04B 1/006 |
| 2022/0399909 | A1 * | 12/2022 | Krishnamachari | H04B 1/04 |

* cited by examiner

*Primary Examiner* — Fayyaz Alam
(74) *Attorney, Agent, or Firm* — 2SPL Patent Attorneys PartG mbB; Kieran O'Leary (57) ABSTRACT

A wireless modem device. The device includes a plurality of transceivers, a plurality of antenna ports, a plurality of RF multiplexers, and a plurality of switches. Each transceiver is configured to process a radio frequency (RF) signal in a specific frequency band. Each antenna port is coupled to one of a plurality of antennas. Each RF multiplexer is configured to split an RF signal received via a common port of the RF multiplexer to one of frequency-specific ports of the RF multiplexer based on a frequency band of the RF signal and combine RF signals received via the frequency-specific ports into the common port, wherein the common port of each RF multiplexer is coupled to one of the antenna ports. Each switch is configurable by software to couple one of the transceivers to one of the antenna ports.

12 Claims, 9 Drawing Sheets

WIRELESS MODEM WITH SOFTWARE CONFIGURABLE MULTIPLE ANTENNA PORTS

FIELD

Examples relate to a wireless modem device with software configurable multiple antenna ports.

BACKGROUND

Conventionally, wireless wide area network (WWAN) modems (e.g., M.2 module) come with four antenna ports configurations (main, diversity (also known as AUX), multiple-input multiple-output 1 (MIMO1), and MIMO2). Main and diversity antennas cover a wide frequency range, for example from 675 MHz to 6 GHz. Designing such a wide band antenna is very challenging specially on thin and narrow bezel systems.

Personal computer (PC) industry is aggressively moving towards extremely sleek form factor designs like thin tablets, dual display, and foldables. There is a strong need for multi antenna port configuration on wireless modem devices.

Conventional approach to address this issue is to create multiple hardware units (stock keeping units (SKUs)) with multiple antenna port configurations. Table 1 shows four hardware units with four or six antenna port configurations. Table 1 lists only main and diversity antenna ports and does not list MIMO antenna ports for simplicity.

TABLE 1

| HW SKU | Number of ANT ports | ANT Configuration | |
|---|---|---|---|
| | | Main | Diversity |
| HW SKU-1 | 4 ANT ports | Main-A (LB + MHB + UHB) | Div-A (LB + GNSS + MHB + UHB) |
| HW SKU-2 | 6 ANT ports | Main-A (MHB + UHB) | Div-A (GNSS + MHB + UHB) |
| | | Main-B (LB) | Div-B (LB) |
| HW SKU-3 | 6 ANT ports | Main-A (LB + UHB) | Div-A (LB + GNSS + UHB) |
| | | Main-B (MHB) | Div-B (MHB) |
| HW SKU-4 | 6 ANT ports | Main-A (LB + MHB) | Div-A (GNSS + UHB) |
| | | Main-B (UHB) | Div-B (LB + MHB) |

This conventional approach adds multiple hardware units as different users may want to have different antenna configurations. However, this conventional approach has some drawbacks of logistic challenges from hardware as well from software standpoint, needs higher design effort and resources and higher verification efforts, and higher certification cost because of multiple hardware.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
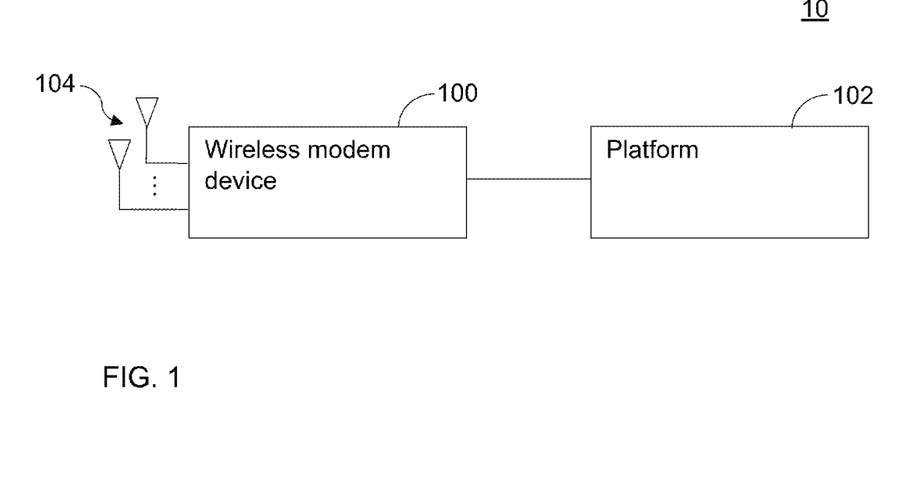
FIG. 1 is a schematic diagram of a computing device including a wireless modem device coupled to a platform of the computing device.

FIG. 1 is a schematic diagram of a computing device 10 including a wireless modem device 100 and a platform 102. The wireless modem device 100 may be in an M.2 module (i.e., Next Generation Form Factor) or any other form factor. The computing device 10 may be a laptop computer, a table computer, a user equipment (UE), a smart phone, or any computing device. The platform 102 is a system that includes hardware devices, circuitries, components, and an operating system that an application, program, or process runs upon. The platform 102 includes a processor(s), a memory, a I/O subsystem, and a bus interface, etc. The platform 102 may also include processing circuitries used for wireless transmission and reception. The computing device 10 includes a plurality of antennas 104 coupled to the wireless modem device 100. For example, in case of a laptop computer, the antennas 104 may be located on the lid of the laptop computer and coupled to the antenna connectors on the wireless modem device 100 via a coax cable, etc. The plurality of antennas 104 may include one or more main antennas for main transmission and reception, one or more diversity antennas for diversity transmission and reception or Global Navigation Satellite System (GNSS) reception, one or more MIMO antennas, and the like.

Examples are disclosed for multi-antenna ports configuration with a single hardware unit. In examples, the wireless modem device 100 may be configured by software for different multi-port antenna configurations.

Figure 2:
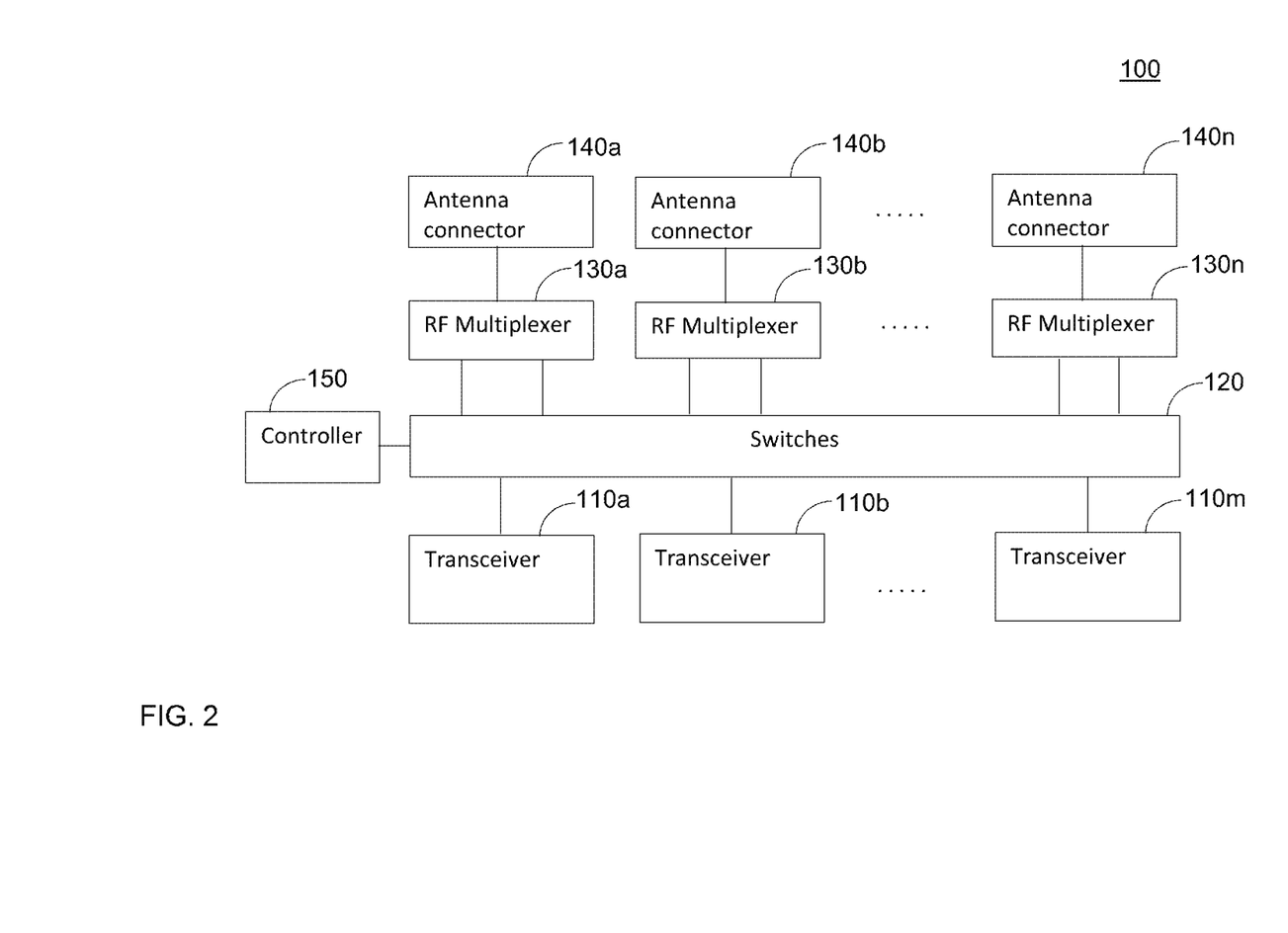
FIG. 2 is a block diagram of an example wireless modem device with software configurable multiple antenna ports.

FIG. 2 is a block diagram of an example wireless modem device 100 with software configurable multiple antenna ports. The wireless modem device 100 includes a plurality of transceivers 110a-110m, a plurality of switches 120, a plurality of RF multiplexers 130a-130n, a plurality of antenna ports 140a-140n (antenna connectors), and a controller 150. Hereafter, the terms "antenna port" and "antenna connector" will be used interchangeably. Each transceiver 110a-110m is configured to process a radio frequency (RF) signal in a specific frequency band. The wireless modem device 100 includes a main transceiver for main transmission and reception processing. The wireless modem device 100 may include a diversity transceiver for diversity transmission and reception processing and GNSS reception processing. The wireless modem device 100 may also include a MIMO transceiver for MIMO transmission and reception processing and/or a New Radio (NR) transceiver for transmission and reception in accordance with Fifth Generation (5G) NR protocol.

Each antenna connector 140a-140n is for coupling to one of a plurality of antennas. For example, the wireless modem device 100 may include six antenna connectors including two antenna connectors to support two main antennas, two antenna connectors to support two diversity antennas, and two antenna connectors to support two MIMO antennas. The wireless modem device 100 may include any number of antenna connectors (more or less than six).

The RF multiplexer 130a-130n (RF splitter/combiner) is configured to split an RF signal received via a common port of the RF multiplexer to one of frequency-specific ports of the RF multiplexer based on a frequency band of the RF signal and combine RF signals received via the frequency-specific ports into the common port. The RF multiplexer 130a-130n may be a diplexer, a triplexer, a quadriplexer, or the like. The common port of each RF multiplexer 130a-130n is coupled to one of the antenna connectors 140a-140n.

Each switch 120 is configurable by software or by the controller 150 to couple one of the transceivers 110a-110m to one of the antenna ports 140a-140n. The switches 120 are configurable by software based on frequency configuration for the antennas.

The transceivers 110a-110m include a main transceiver for main transmission and reception processing and a diversity transceiver for diversity transmission and/or reception processing and/or GNSS reception processing. The main transceiver may be switchable among a first subset of antenna ports and the diversity transceiver may be switchable among a second subset of different antenna ports by switches coupled to the main transceiver and the diversity transceiver, respectively.

In some examples, the main transceiver may be switchable from the first subset of antenna ports to the second subset of antenna ports, or the diversity transceiver may be switchable from the second subset of antenna ports to the first subset of antenna ports. The main transceiver and/or the diversity transceiver may be switched between the main antenna(s) and the diversity antenna(s) for best antenna selection (BAS). In this example, the main transceiver and the diversity transceiver may be configured to process an RF signal in a low frequency band (LB).

In some examples, one of the first subset of antenna ports is configured to support any combination of an LB, a mid-to-high frequency band (MHB) and an ultra-high frequency band (UHB), and another one of the first subset of antenna ports is configured to support one of the LB, the MHB, or the UHB. One of the second subset of antenna ports is configured to support any combination of the LB, the MHB, and the UHB, and another one of the second subset of antenna ports is configured to support one of the LB, the MHB, or the UHB. The LB may be in the range of 617-960 MHz, the MHB may be in the range of 1424-2700 MHz, and the UHB may be in the range of 3300-6000 MHz.

In some examples, an antenna port for at least one of the transceivers 110a-110m may be dynamically switched from one antenna port to another antenna port based on a quality measure measured on each antenna.

In some examples, the switches may be configured to place an antenna for cellular communication far from an antenna for Wi-Fi communication. For example, in case of cellular and Wi-Fi coexistence scenario, the cellular antenna and the Wi-Fi antenna may be placed far from each other by configuring the switches. This can help reducing the interference from each other.

In some examples, the plurality of transceivers may include a first transceiver configured to process an RF signal in an LB, and a second transceiver configured to process an RF signal in an MHB, and a third transceiver configured to process an RF signal in a UHB, and the switches are configurable to couple each of the first, second, and third transceivers to one or more of the plurality of antenna ports.

It should be noted that examples will be explained with reference to the case for four different configurations for 4 or 6 antenna ports, as shown in FIGS. 3-7. However, the configurations shown in FIGS. 3-7 are provided merely as an example, not as a limitation, and the example schemes disclosed herein are applicable to any number of different configurations for any number of antenna ports.

Figure 3:
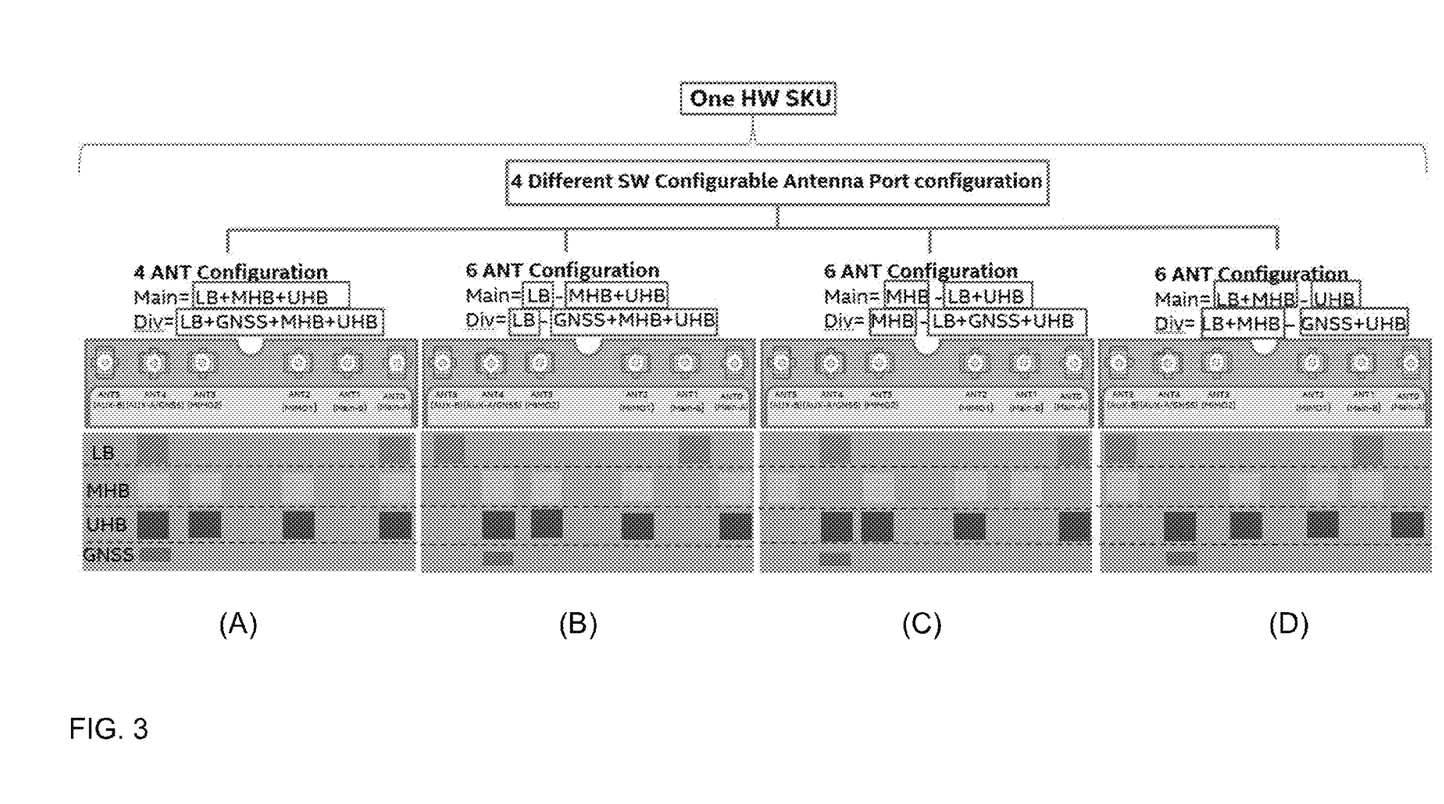
FIG. 3 illustrates an example for six antenna port configurations with a single hardware unit for a main antenna port and a diversity antenna port.

FIG. 3 illustrates an example for six antenna port configurations with a single hardware unit for a main antenna port and a diversity antenna port. In this example, the hardware unit has options to configure the wireless modem device 100 for 4 or 6 antenna ports with flexibility of configuring frequency bands as per Table 2 as an example. It should be noted that the configurations in FIG. 3 and Table 2 are merely examples, not a limitation, and the antennas may be configured differently in accordance with the user's requirements.

In the first configuration (A) in FIG. 3, which corresponds to Config-1 in Table 2, the main antenna port is configured to support an LB, an MHB, and an UHB, and a diversity antenna port is configured to support a LB, a GNSS band, a MHB, and a UHB. This is a baseline configuration for backward compatibility and cost effective for larger system designs.

In the second configuration (B) in FIG. 3, which corresponds to Config-2 in Table 2, the first main antenna port is configured to support an MHB and an UHB and the second main antenna port is configured to support an LB, and the first diversity antenna port is configured to support a GNSS band, an MHB and UHB and the second diversity antenna port is configured to support an LB. This configuration has a dedicated LB antenna for both main processing and diversity processing. With this configuration, there is a flexibility to move the LB antenna separately, for example to a lid side of a laptop where more areas are available for the LB antenna design.

In the third configuration (C) in FIG. 3, which corresponds to Config-3 in Table 2, the first main antenna port is configured to support an LB and an UHB and the second main antenna port is configured to support an MHB, and the first diversity antenna port is configured to support an LB, a GNSS band and UHB and the second diversity antenna port is configured to support an MHB. This configuration has a dedicated MHB antenna and combined LB+UHB antenna for a thin profile system.

In the fourth configuration (D) in FIG. 3, which corresponds to Config-4 in Table 2, the first main antenna port is configured to support an LB and an MHB and the second main antenna port is configured to support an UHB, and the first diversity antenna port is configured to support a GNSS band, and a UHB and the second diversity antenna port is configured to support an LB and an MHB. This configuration may help enhancing the conventional system design which can support till MHB by adding one dedicated UHB antenna.

Frequency configuration of the main and diversity antenna ports may be configured using a software. Users can select configuration, for example as shown in Table 2, based on the user's system design requirements. Depending on the specific antenna design, preference on the frequency split may vary. An RF customization file with multiple configurations can be loaded in the factory depending upon the system design. When the system is powered-on first time, the wireless modem device reads the configuration from the RF customization file and configure the front-end switches according to the selected configuration. The wireless modem device firmware (FW) will select right calibration values as per the RF configuration table and applies the correct compensation values.

The example schemes disclosed herein simplify antenna design and give flexibility in system design to split the antenna frequencies for better system performance and to fit the antenna pattern into thin systems such as laptop computer, tablet computer, or the like. It needs one-time module development and validation efforts, and no product certification overhead is incurred due to multiple hardware units. Multi antenna configuration can be enhanced to support best antenna selection (BAS) in LB as well.

Figure 4:
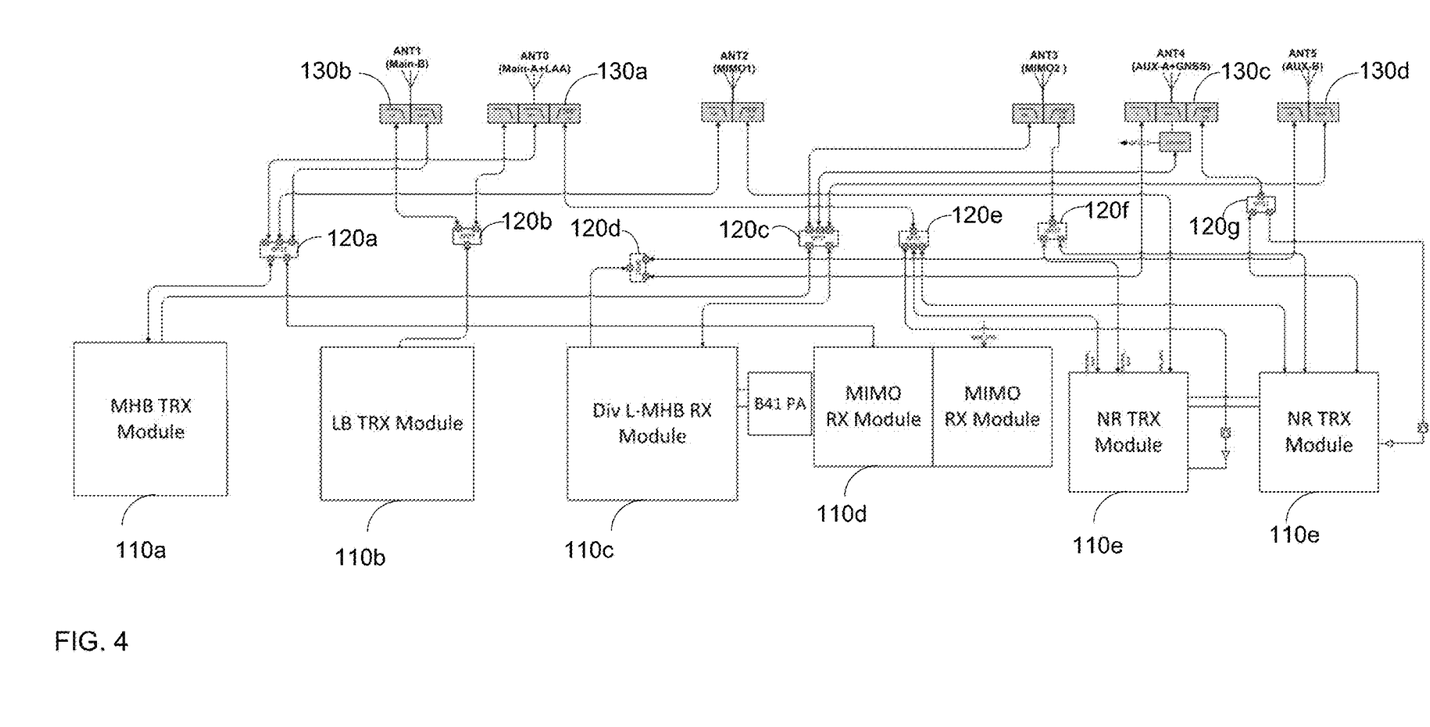
FIG. 4 is a block diagram of an example wireless modem device with six antenna ports.

FIG. 4 is a block diagram of an example wireless modem device with six antenna ports (ANT0 through ANT5). In this example, the wireless modem device 100 includes two main antenna ports (ANT0, ANT1), two diversity antenna ports (ANT4, ANT5), and two MIMO antenna ports (ANT2, ANT3), but the wireless modem device 100 may include more or less than six antenna ports. The antenna ports ANT0-ANT5 (including the main and diversity antenna ports) are configurable by software on the bases of the frequency split.

The wireless modem device 100 includes a plurality of transceivers (TRXs) including a main TRX 110a, 110b for main transmission and reception processing. The device 100 may include a diversity TRX 110c for diversity transmission and reception processing and GNSS reception processing. The device 100 may also include a MIMO TRX 110d for MIMO transmission and reception processing, and/or an NR TRX 110e for NR transmission and reception processing. The diversity TRX 110c and the MIMO TRX 110d may be just a receiver. The main TRX may be two separate modules of a main MHB TRX 110a for transmission and reception processing in an MHB and a main LB TRX 110b for transmission and reception processing in an LB, as illustrated in FIG. 4, but they may be incorporated into a single module. Similarly, the diversity TRX module 110c may be two separate modules of a diversity MHB TRX for transmission and reception processing in an MHB and a diversity LB TRX for transmission reception processing in an LB or a single module including a diversity MHB TRX and a diversity LB TRX as shown in FIG. 4.

The first main antenna port ANT0 (Main-A) is connected through a triplexer 130a. The triplexer 130a can support an LB, an MHB, and an UHB so that the first main antenna port ANT0 can support any possible combinations of an LB, an MHB, and an UHB as per Table 2. The second main antenna port ANT1 (Main-B) is connected through a diplexer 130b which can support both an LB and an MHB. Combination of switches are used to connect each of the main MHB TRX 110a and the main LB TRX 110b to one of the main antenna

TABLE 2

| SW configuration | Number of ANT ports | ANT Configuration | |
|---|---|---|---|
| | | Main | Diversity |
| Config-1 | 4 ANT ports | Main-A (LB + MHB + UHB) | Div-A (LB + GNSS + MHB + UHB) |
| Config-2 | 6 ANT ports | Main-A (MHB + UHB) Main-B (LB) | Div-A (GNSS + MHB + UHB) Div-B (LB) |
| Config-3 | 6 ANT ports | Main-A (LB + UHB) Main-B (MHB) | Div-A (LB + GNSS + UHB) Div-B (MHB) |
| Config-4 | 6 ANT ports | Main-A (LB + MHB) Main-B (UHB) | Div-A (GNSS + UHB) Div-B (LB + MHB) | ports ANT0 and ANT1, or other antenna ports. For example, a double pole three throws (DP3T) switch 120*a* may couple the main MHB TRX 110*a* to antenna port ANT0 or ANT1 (or ANT2) depending on the frequency configuration. A single pole double throws (SPDT) switch 120*b* may couple the main LB TRX 110*b* to antenna port ANT0 or ANT1 depending on the frequency configuration. The switches 120*a*, 120*b* can be configured through software to support the antenna configuration as defined in Table 2.

The first diversity antenna port ANT4 (AUX-A/GNSS) is connected through a triplexer 130*c*. The triplexer 130*c* can support an LB, an MHB, and an UHB so that the first diversity antenna port ANT4 can support any possible combinations of an LB, an MHB, an UHB, and a GNSS band as per Table 2. The second diversity antenna port ANT5 (AUX-B) is connected through a diplexer 130*d* which can support both an LB and an MHB. Combination of switches are used to connect the diversity TRX 110*c* to the diversity antenna ports ANT4 and ANT5. For example, a DP3T switch 120*c* may couple a diversity MHB TRX in the diversity TRX 110*c* to antenna port ANT4 or ANT5 depending on the frequency configuration, and a single pole double throws (SPDT) switch 120*b* may couple a diversity LB TRX in the diversity TRX 110*c* to antenna port ANT4 or ANT5 depending on the frequency configuration. The switches 120*c*, 120*d* can be configured through software to support the antenna configuration as defined in Table 2.

The MIMO TRX 110*d* and the NR TRX 110*e* may also be switched to one or more of the antenna ports by the switches 120*a*, 120*e*, 120*f*, 120*g*. By configuring the switches 120*a* through 120*g*, the wireless modem device 100 can be configured for any configuration (e.g., any one of config-1 through config-4 in Table 2) based on the user's system requirements.

As a single hardware unit can support multiple antenna configurations, the customized config file can be loaded based on the user requirements in the factory config lines. Different users may choose different configuration depending on the user's needs. When the modem boots first time, it will automatically configure the defined antenna configuration.

Figure 5:
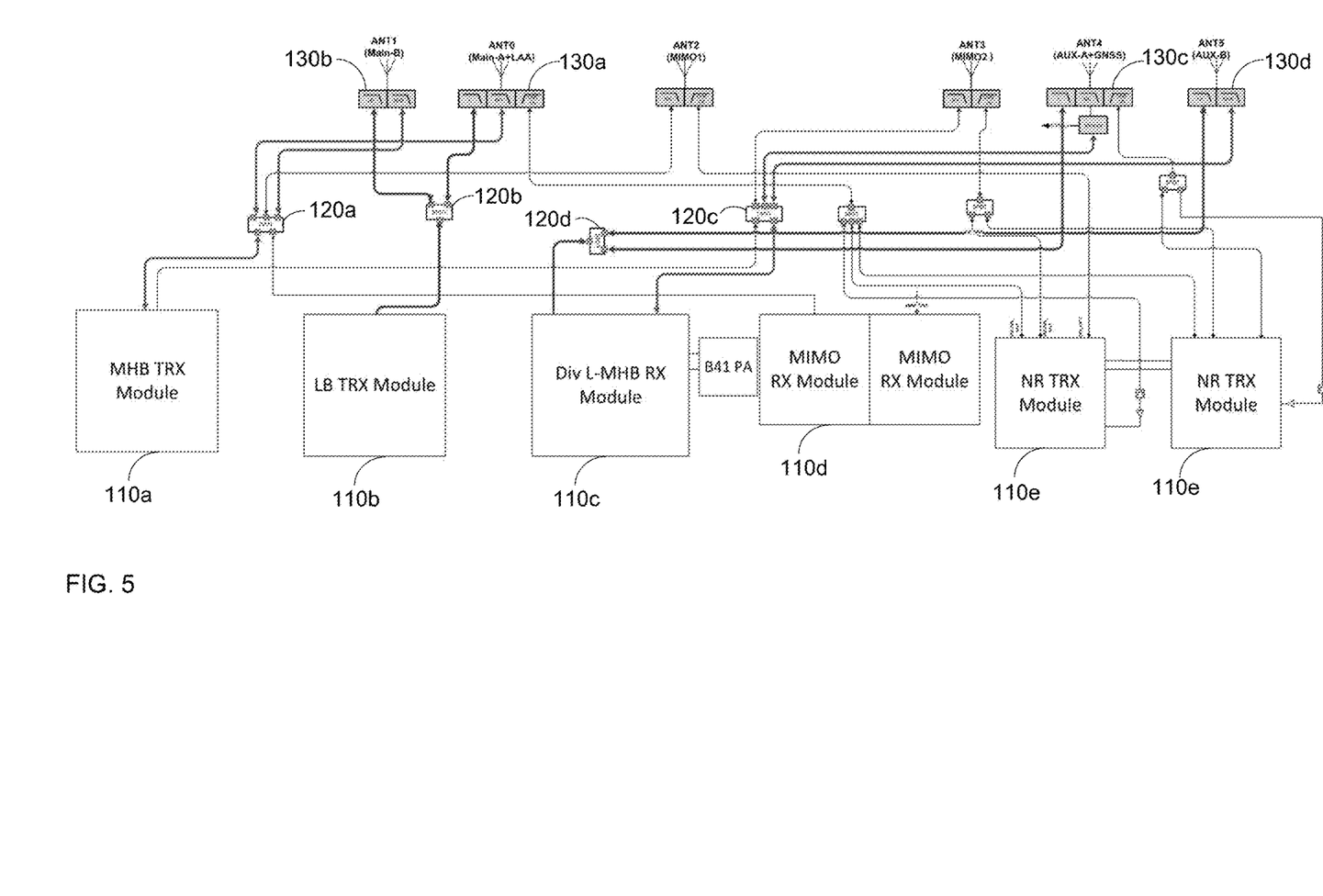
FIG. 5 shows switching of main and diversity antenna ports, respectively.

FIG. 5 shows switching of main and diversity antenna ports, respectively. The antenna port switching for the main MHB TRX 110*a* between ANT0 and ANT1 is supported through a switch 120*a* (e.g., a DP3T switch). Similarly, the antenna port switching for the main LB TRX 110*b* between ANT0 and ANT1 is supported by a switch 120*b* (e.g., a SPDT switch). This switching can be controlled by software.

The MHB antenna port switching between ANT4 and ANT5 for the diversity TRX 110*c* can be supported through a switch 120*c* (e.g., a DP3T switch). Similarly, the LB antenna port switching between ANT4 and ANT5 for the diversity TRX 110*c* can be implemented with a switch 120*d* (e.g., a SPDT switch). This switching can be controlled by software.

Similarly, if needed, the antenna port for the MIMO TRX or the NR TRX may also be switched by configuring the switches.

In some examples, best antenna selection (BAS) may be implemented. One or a subset of antennas may be selected dynamically depending on a quality measure on the antennas, such as signal-to-noise ratio (SNR), a received signal strength indicator (RSSI), etc. The controller 150 in the wireless modem device 100 may determine the quality measure, such as SNR, RSSI, or the like, on the antennas and may dynamically control the switches 120 to select or switch the antenna ports 140 for the transceivers 110. Conventional wireless modem modules do not support BAS in an LB path. In accordance with the example schemes disclosed herein, as switches are added in the LB path, the advantage of LB antenna BAS can be achieved.

Figure 6:
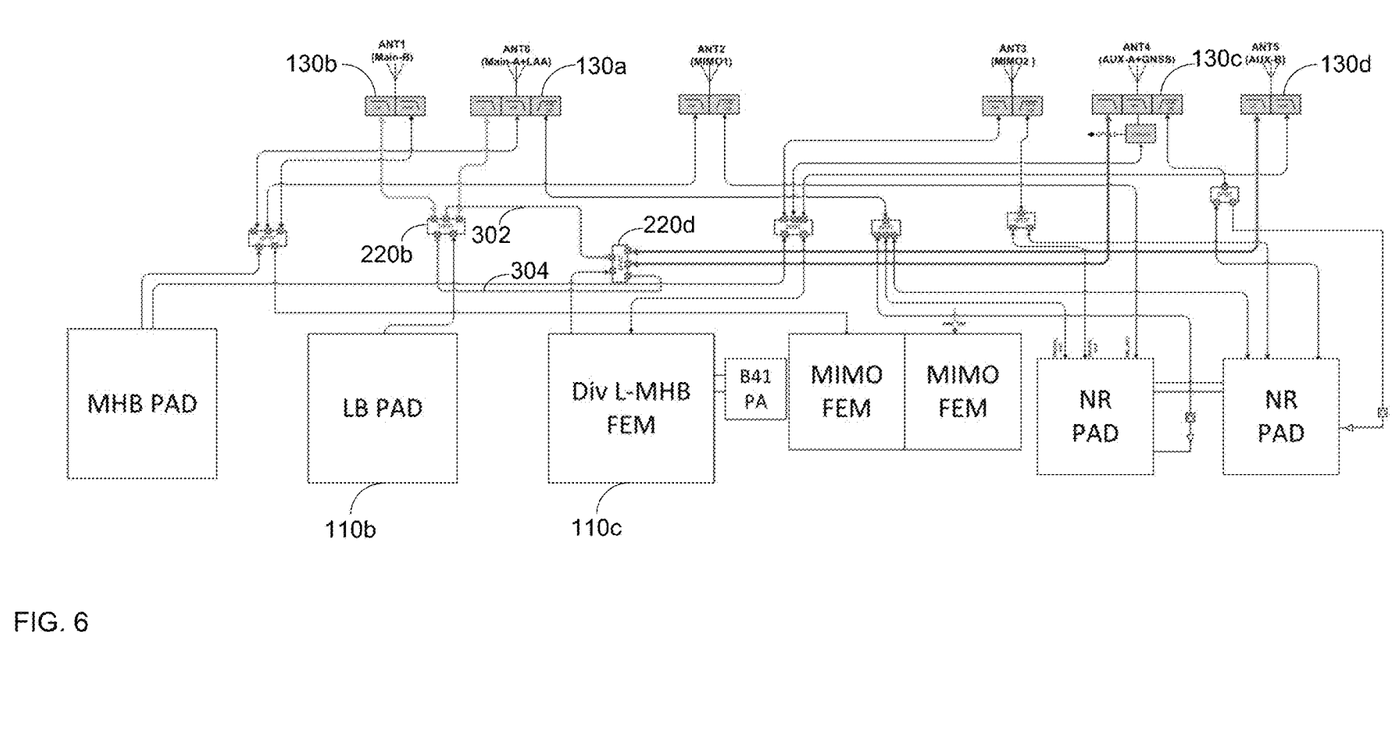
FIG. 6 shows an example low frequency band antenna swap configuration.

FIG. 6 shows an example low frequency band antenna swap configuration. In this example, the two SPDT switches 120*b*, 120*d* in the LB path for the main and diversity TRX 110*b*, 110*c* in FIG. 5 are replaced with DP3T switches 220*b*, 220*d* and the two DP3T switches 220*b*, 220*d* are back-to-back connected (i.e., the connection 302 from switch 220*b* to switch 220*d*, and the connection 304 from switch 220*d* to switch 220*b* are added). The main LB TRX 110*b* may be routed to ANT4 or ANT 5 (diversity antennas) via the DP3T switches 220*b* and 220*d*, and the diversity TRX 110*c* may be routed to ANT0 or ANT 1 (main antennas) via the DP3T switches 220*d* and 220*b*. The LB antenna swap may be enabled along with multi antenna configuration. The switches 220*b*, 220*d* may be configured through software or control signalling by the controller 150 to achieve BAS and multi antenna configuration for low frequency bands.

Figure 7:
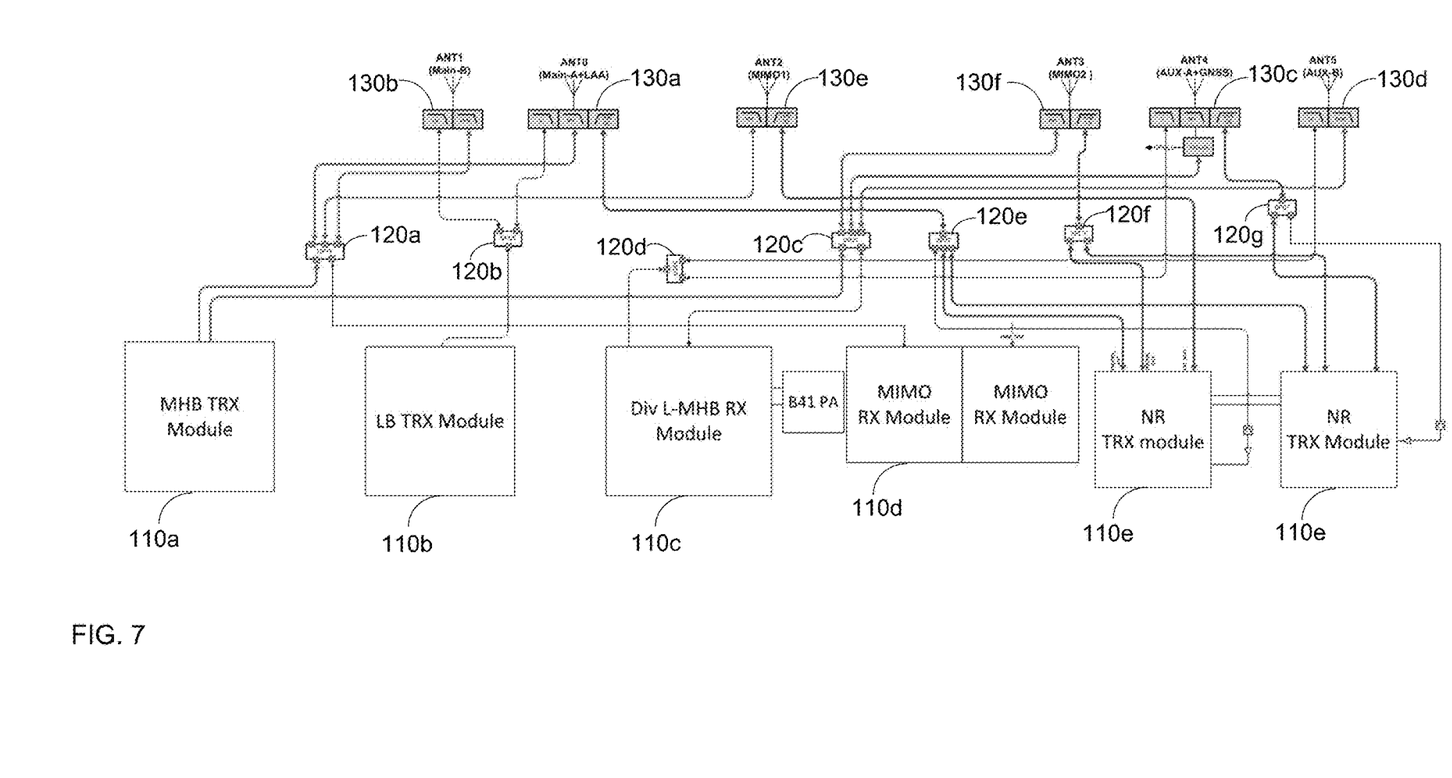
FIG. 7 shows mid-to-high band (MHB) and ultra-high band (UHB) antenna swap.

Antenna swap or switching may be implemented for MHB or UHB as well. FIG. 7 shows MHB and UHB antenna swap (e.g., 4×4 MIMO antenna swap). As per the example configuration specified in FIG. 7, one or a set of antennas may be switched for the MHB or UHB for implementing BAS. In this example, one or more antennas may be switched/swapped for best antenna selection by configuring switches 120*a* through 120*g*. For N×N MIMO in the MHB or the UHB (N being a positive integer greater than one), a set of best N antennas may be selected among the available antennas.

The transmit antenna swap configuration gives an advantage in configuring the right transmit antennas in the system. For example, when a Wi-Fi antenna (i.e., the antenna for Wi-Fi communication) is placed in very close proximity to a cellular antenna (i.e., the antenna for cellular-based communication such as Third Generation (3G), Fourth Generation (4G), Fifth Generation (5G), or the like), the cellular antenna or the Wi-Fi antenna may be switched to a different antenna. In case of cellular-Wi-Fi coexistence scenarios, the system designer can ensure that the transmit configuration of the cellular antennas are enabled such that the antennas placed far from the Wi-Fi antennas are configured as a cellular antenna(s) rather than the antenna(s) placed in close proximity of a Wi-Fi antenna, or vice versa.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

Figure 8:
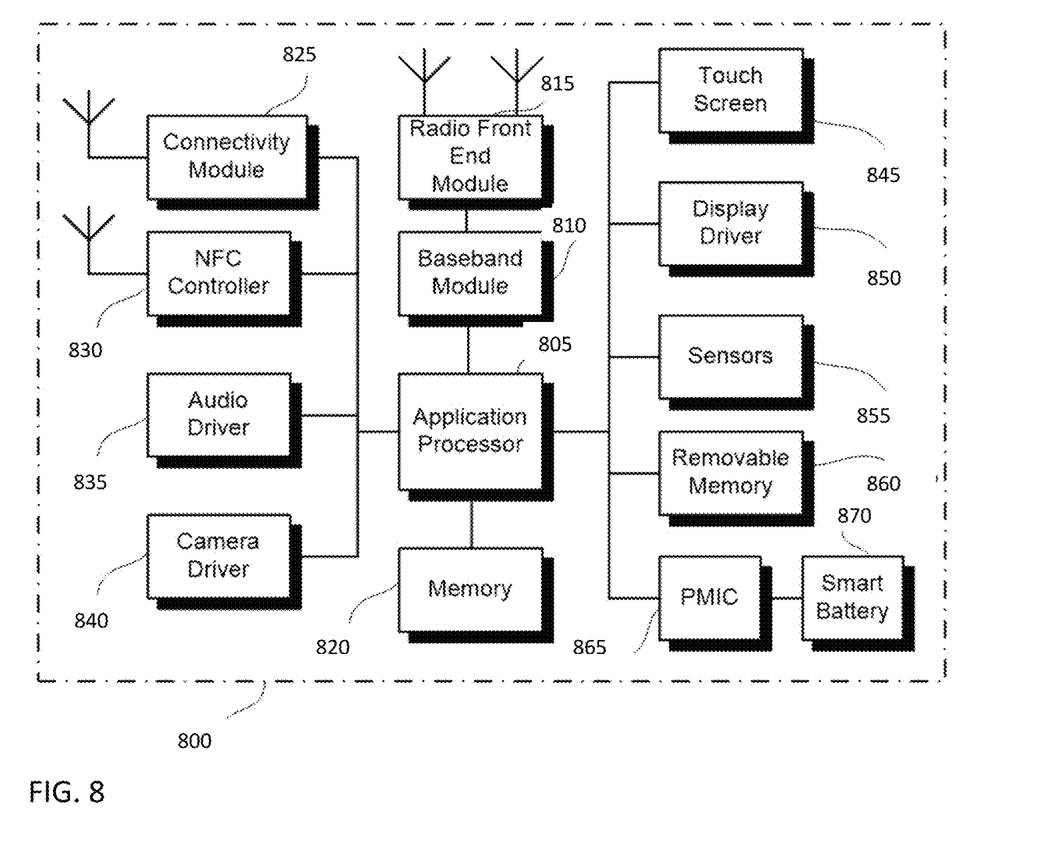
FIG. 8 illustrates a user device in which the examples disclosed herein may be implemented.

FIG. 8 illustrates a user device 800 in which the examples disclosed herein may be implemented. For example, the examples disclosed herein may be implemented in the radio front-end module 815, in the baseband module 810, etc. The user device 800 may be a mobile device in some aspects and includes an application processor 805, baseband processor 810 (also referred to as a baseband module), radio front end module (RFEM) 815, memory 820, connectivity module 825, near field communication (NFC) controller 830, audio driver 835, camera driver 840, touch screen 845, display driver 850, sensors 855, removable memory 860, power management integrated circuit (PMIC) 865 and smart battery 870.

In some aspects, application processor 805 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 810 may be implemented, for example, as a solder-down substrate including one or more integrated circuits, a single packaged integrated circuit soldered to a main circuit board, and/or a multi-chip module containing two or more integrated circuits.

Figure 9:
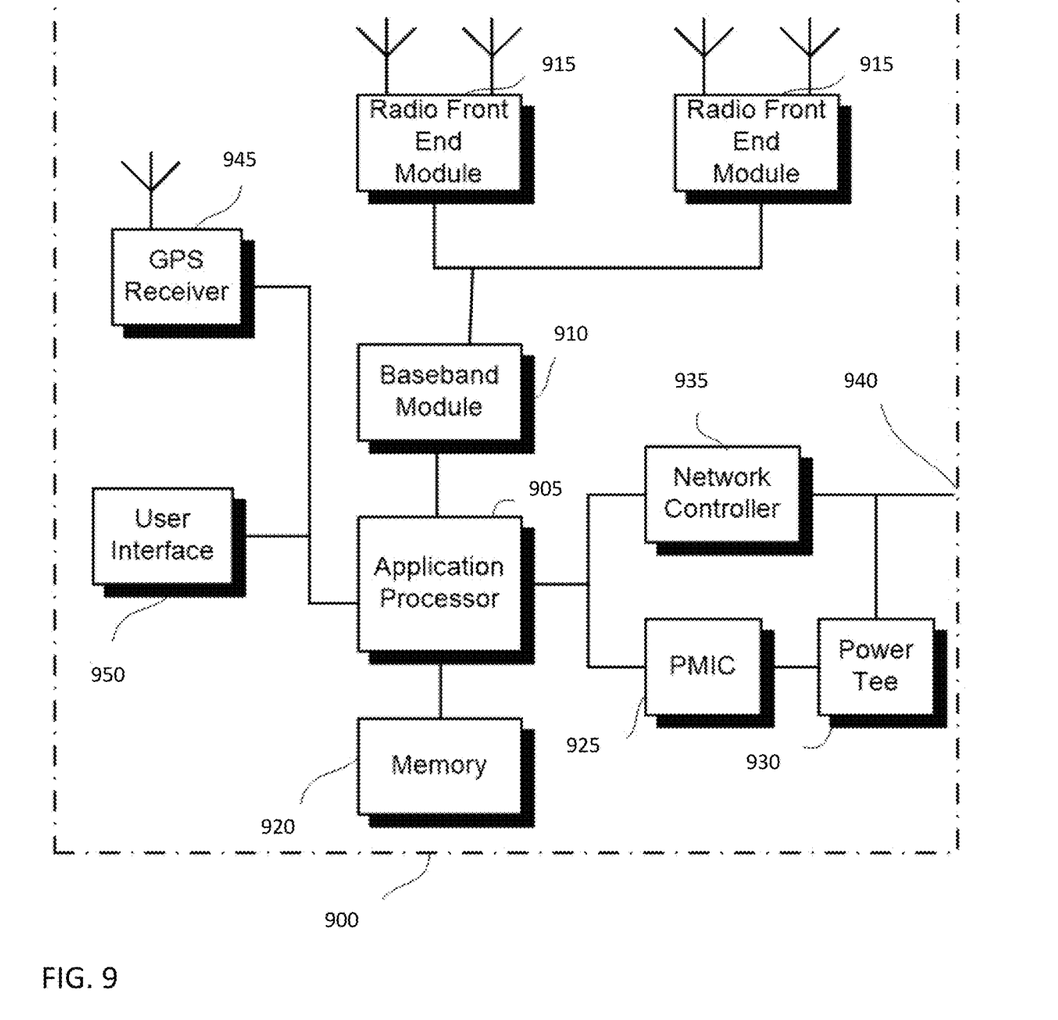
FIG. 9 illustrates a base station or infrastructure equipment radio head in which the examples disclosed herein may be implemented.

FIG. 9 illustrates a base station or infrastructure equipment radio head 900 in which the examples disclosed herein may be implemented. For example, the examples disclosed herein may be implemented in the radio front-end module 915, in the baseband module 910, etc. The base station radio head 900 may include one or more of application processor 905, baseband modules 910, one or more radio front end modules 915, memory 920, power management circuitry 925, power tee circuitry 930, network controller 935, network interface connector 940, satellite navigation receiver module 945, and user interface 950.

In some aspects, application processor 905 may include one or more CPU cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 910 may be implemented, for example, as a solder-down substrate including one or more integrated circuits, a single packaged integrated circuit soldered to a main circuit board or a multi-chip module containing two or more integrated circuits.

In some aspects, memory 920 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto resistive random access memory (MRAM) and/or a three-dimensional crosspoint memory. Memory 920 may be implemented as one or more of solder down packaged integrated circuits, socketed memory modules and plug-in memory cards.

In some aspects, power management integrated circuitry 925 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 930 may provide for electrical power drawn from a network cable to provide both power supply and data connectivity to the base station radio head 900 using a single cable.

In some aspects, network controller 935 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 945 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 945 may provide data to application processor 905 which may include one or more of position data or time data. Application processor 905 may use time data to synchronize operations with other radio base stations.

In some aspects, user interface 950 may include one or more of physical or virtual buttons, such as a reset button, one or more indicators such as light emitting diodes (LEDs) and a display screen.

The examples as described herein may be summarized as follows:

An example (e.g., example 1) relates to a wireless modem device. The wireless modem device includes a plurality of transceivers, a plurality of antenna ports, a plurality of RF multiplexers, and a plurality of switches. Each transceiver is configured to process an RF signal in a specific frequency band. Each antenna port is to be coupled to one of a plurality of antennas. Each RF multiplexer is configured to split an RF signal received via a common port of the RF multiplexer to one of frequency-specific ports of the RF multiplexer based on a frequency band of the RF signal and combine RF signals received via the frequency-specific ports into the common port, wherein the common port of each RF multiplexer is coupled to one of the antenna ports. Each switch is configurable by software to couple one of the transceivers to one of the antenna ports.

Another example (e.g., example 2) relates to a previously described example (e.g., example 1) wherein the transceivers include a main transceiver for main transmission and reception processing and a diversity transceiver for diversity transmission and/or reception processing and/or GNSS reception processing, and the main transceiver is switchable among a first subset of antenna ports and the diversity transceiver is switchable among a second subset of different antenna ports by switches coupled to the main transceiver and the diversity transceiver, respectively.

Another example (e.g., example 3) relates to a previously described example (e.g., example 2), wherein the main transceiver is switchable from the first subset of antenna ports to the second subset of antenna ports, or the diversity transceiver is switchable from the second subset of antenna ports to the first subset of antenna ports.

Another example (e.g., example 4) relates to a previously described example (e.g., example 3), wherein the main transceiver and the diversity transceiver are configured to process an RF signal in an LB.

Another example (e.g., example 5) relates to a previously described example (e.g., any one of examples 2-4), wherein one of the first subset of antenna ports is configured to support any combination of LB, MHB and UHB, and another one of the first subset of antenna ports is configured to support one of the LB, the MHB, or the UHB, and one of the second subset of antenna ports is configured to support any combination of the LB, the MHB, and the UHB, and another one of the second subset of antenna ports is configured to support one of the LB, the MHB, or the UHB.

Another example (e.g., example 6) relates to a previously described example (e.g., any one of examples 1-5), wherein an antenna port for at least one of the transceivers is dynamically switched from one antenna port to another antenna port based on a quality measure measured on each antenna.

Another example (e.g., example 7) relates to a previously described example (e.g., any one of examples 1-6), wherein the switches are configurable to place an antenna for cellular communication far from an antenna for Wi-Fi communication among the plurality of antennas.

Another example (e.g., example 8) relates to a previously described example (e.g., any one of examples 1-7), wherein the plurality of transceivers include a first transceiver configured to process an RF signal in an LB, and a second transceiver configured to process an RF signal in an MHB, and a third transceiver configured to process an RF signal in a UHB, wherein the switches are configurable to couple each of the first, second, and third transceivers to one or more of the plurality of antenna ports.

Another example (e.g., example 9) relates to a previously described example (e.g., any one of examples 1-8), wherein the plurality of antenna ports include two antenna ports for supporting two main antennas, two antenna ports for supporting two diversity antennas, and two antenna ports for supporting MIMO antennas.

Another example (e.g., example 10) relates to a previously described example (e.g., any one of examples 1-9), wherein the switches are configurable by software based on frequency configuration for the antennas.

Another example (e.g., example 11) relates to a previously described example (e.g., any one of examples 1-10), wherein the wireless modem device in an M.2 module.

Another example (e.g., example 12) relates to a computing device. The computing device includes a plurality of antennas and the wireless modem device as in any one of examples 1-11.

Another example (example 13) relates to a UE. The UE includes a plurality of antennas and the wireless modem device as in any one of examples 1-11.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A wireless modem device comprising:
   a plurality of transceivers, each transceiver being configured to process a radio frequency (RF) signal in a specific frequency band;
   a plurality of antenna ports, each antenna port to be coupled to one of a plurality of antennas;
   a plurality of RF multiplexers, wherein each RF multiplexer is configured to split an RF signal received via a common port of the RF multiplexer to one of frequency-specific ports of the RF multiplexer based on a frequency band of the RF signal and combine RF signals received via the frequency-specific ports into the common port, wherein the common port of each RF multiplexer is coupled to one of the antenna ports;
   a plurality of switches, wherein each switch is configurable by software to couple one of the transceivers to one of the antenna ports,
   wherein an antenna port for at least one of the transceivers is dynamically switched from one antenna port to another antenna port based on a quality measure measured on each antenna.

2. The wireless modem device of claim 1, wherein the transceivers include a main transceiver for main transmission and reception processing and a diversity transceiver for diversity transmission and/or reception processing and/or Global Navigation Satellite System (GNSS) reception processing, and the main transceiver is switchable among a first subset of antenna ports and the diversity transceiver is switchable among a second subset of different antenna ports by switches coupled to the main transceiver and the diversity transceiver, respectively.

3. The wireless modem device of claim 2, wherein the main transceiver is switchable from the first subset of antenna ports to the second subset of antenna ports, or the diversity transceiver is switchable from the second subset of antenna ports to the first subset of antenna ports.

4. The wireless modem device of claim 3, wherein the main transceiver and the diversity transceiver are configured to process an RF signal in a low frequency band (LB).

5. The wireless modem device of claim 2, wherein one of the first subset of antenna ports is configured to support any combination of low frequency band (LB), mid-to-high frequency band (MHB) and ultra-high frequency band (UHB), and another one of the first subset of antenna ports is configured to support one of the LB, the MHB, or the UHB, and one of the second subset of antenna ports is configured to support any combination of the LB, the MHB, and the UHB, and another one of the second subset of antenna ports is configured to support one of the LB, the MHB, or the UHB.

6. The wireless modem device of claim 1, wherein the switches are configurable to place an antenna for cellular communication far from an antenna for Wi-Fi communication among the plurality of antennas.

7. The wireless modem device of claim 1, wherein the plurality of transceivers include a first transceiver configured to process an RF signal in a low frequency band (LB), and a second transceiver configured to process an RF signal in a mid-to-high frequency band (MHB), and a third transceiver configured to process an RF signal in an ultra-high frequency band (UHB), wherein the switches are configurable to couple each of the first, second, and third transceivers to one or more of the plurality of antenna ports.

8. The wireless modem device of claim 1, wherein the plurality of antenna ports include two antenna ports for supporting two main antennas, two antenna ports for supporting two diversity antennas, and two antenna ports for supporting multiple-input multiple output (MIMO) antennas.

9. The wireless modem device of claim 1, wherein the switches are configurable by software based on frequency configuration for the antennas.

10. The wireless modem device of claim 1, wherein the wireless modem device in an M.2 module.

11. A computing device comprising:
    a plurality of antennas; and
    the wireless modem device of claim 1.

12. A user equipment comprising:
    a plurality of antennas; and
    the wireless modem device of claim 1.

* * * * *